United States Patent [19]

Ratner et al.

[11] Patent Number: 5,354,053

[45] Date of Patent: Oct. 11, 1994

[54] PLAY BALL

[75] Inventors: Donald Ratner; Paul Feinsinger, both of Westlake Village, Calif.; Frank Hsieh, Taipei, Taiwan

[73] Assignee: Kransco, San Francisco, Calif.

[21] Appl. No.: 86,617

[22] Filed: Jul. 1, 1993

[51] Int. Cl.$^5$ .......................... A63B 41/08; A63B 45/00
[52] U.S. Cl. .................... 273/65 EG; 40/327; 264/245
[58] Field of Search .............. 273/65 R, 65 E, 65 ED, 273/65 EE, 65 EF, 65 EG, 58 K, 58 J; 40/327

[56] References Cited

U.S. PATENT DOCUMENTS

| | | | |
|---|---|---|---|
| D. 72,693 | 5/1927 | Beldam | D21/205 |
| D. 311,313 | 12/1992 | Lesbirel | D2/320 |
| 2,011,760 | 8/1935 | Gallinant | 273/65 EG |
| 2,324,277 | 7/1943 | Casey et al. | 273/58 K X |
| 2,859,040 | 11/1958 | Gow et al. | 273/65 EG |
| 2,874,964 | 2/1959 | Edwards | 273/58 J |
| 3,303,250 | 2/1967 | Bingham, Jr. | 264/145 |
| 3,327,334 | 6/1967 | Wilmanns et al. | 36/32 |
| 3,652,757 | 3/1972 | Wessel et al. | 264/244 |
| 4,000,894 | 1/1977 | Butzen | 273/65 EG |
| 4,258,917 | 3/1981 | Murphy | 273/65 ED |
| 4,307,521 | 12/1981 | Inohara et al. | 36/31 |
| 4,345,759 | 8/1982 | Nims | 273/65 R |
| 4,570,931 | 2/1986 | Martin | 273/65 EG |
| 4,660,831 | 4/1987 | Kralik | 273/65 E |
| 4,796,888 | 1/1989 | Louez | 273/58 R |
| 4,867,450 | 9/1989 | Katz | 273/29 A |
| 4,928,962 | 5/1990 | Finley | 273/65 EG |
| 4,991,842 | 2/1991 | Finley | 273/65 EG |
| 5,141,578 | 8/1992 | Yang | 156/79 |
| 5,143,377 | 9/1992 | Oka et al. | 273/232 |
| 5,165,685 | 11/1992 | Hynes | 273/65 EG |
| 5,181,717 | 1/1993 | Donntag et al. | 273/58 BA |
| 5,195,745 | 3/1993 | Rudell et al. | 273/58 K X |

FOREIGN PATENT DOCUMENTS

| | | | |
|---|---|---|---|
| 583557 | 9/1959 | Canada | 273/65 EG |
| 118170 | 10/1957 | France | 273/58 K |
| 2443850 | 8/1980 | France | 273/65 R |
| 53-61668 | 6/1978 | Japan | 273/65 ED |
| 53-101441 | 8/1980 | Japan | |
| 59-68217 | 4/1984 | Japan | 264/245 |
| 59-125575 | 7/1984 | Japan | 273/65 ED |
| 590224 | 8/1947 | United Kingdom | |

*Primary Examiner*—George J. Marlo
*Attorney, Agent, or Firm*—Kolisch, Hartwell, Dickinson, McCormack & Heuser

[57] ABSTRACT

A play ball having visually distinctive colored patches distributed over its exterior. Portions of the ball exterior may be uncovered with patches, and have a color distinct from the color of patches. Regions of different tactile patterns are impressed on the ball, and these regions may match all or parts of differently colored patches. A method of making a game ball with patches on its exterior.

3 Claims, 3 Drawing Sheets

PLAY BALL

BACKGROUND OF THE INVENTION

This invention relates to a game or play ball, and a method of manufacturing the ball. Balls incorporating the invention are exemplified by basketballs and soccer balls, although it should be understood that the invention is not limited to these particular balls, but may be incorporated with balls of other types.

One object of the invention is to provide a new and improved game ball, which includes what are referred to herein as strips or patches distributed about the ball exterior, with the strips or patches of visually distinctive colors that set the patches off from each other and from background regions of the ball. The ball contemplated in appearance is strikingly different from other balls.

Another object is to provide a new and improved game ball having three-dimensional embossed patterns in regions distributed about the ball exterior, referred to in this disclosure as tactile pattern regions. The tactile pattern of a given tactile pattern region may differ from the patterns of adjacent regions. Additionally, tactile pattern regions on the ball may have a size and shape that complement or match significant portions of different patch regions on the ball, or complement or match significant parts of background regions on the exterior of the ball devoid of any patch. The result is a ball which provides surprisingly enhanced grip or traction for users of the ball, and grip regions are readily discernable. The ball is well suited for use in informal or unimproved playing areas, where ball wear and ball slipperiness may effect play. With tactile pattern regions complementing or matching different patch or background regions on the ball, the visual distinctiveness of the distributed patch regions is enhanced. Additionally, an opportunity is provided the user, if he or she so desires, to rapidly select a given region of the ball that has the gripping characteristics the user prefers.

The ball of the invention further features seam-simulating channels extending about the exterior of the ball cutting across background and patch regions. Preferably the location of these channels is enhanced by the application of a distinct color therealong. A ball of striking and attractive appearance results.

Additional objects of the invention include the provision of novel methods of manufacturing a ball of the type contemplated. Described herein is a method for properly positioning at selected and predetermined locations, on the interior of a placement mold, overlay patches or strips for application to the exterior of a ball body. After being properly positioned, a ball body is placed within the mold and the mold assembled about the ball body, and the ball body then inflated. This is followed with transfer of the patches from positions held on the mold to predetermined positions on the exterior of the ball body. Transfer is effectuated with adherence to the ball body of the patches transferred.

The ball body and the transferred patches may then be processed in a heated or vulcanizing mold, with this mold including textured regions distributed about an internal mold surface of the mold. The ball body and patches are positioned int eh vulcanizing mold, to produce proper registry of tactile pattern regions on the mold surface with patch and background regions on the ball body. With the ball body properly positioned, and the mold assembled about the ball body, and wit heat then applied, tactile pattern regions are impressed on the ball. With the ball body covered with a vulcanizable elastomer coating, and the patches or strips composed of vulcanizable elastomer sheet material, the patches and coating become fused together in the final vulcanized product.

These and other objects and advantages are attained by the invention, which is described herein and below in conjunction with the accompanying drawings, wherein:

DETAILED DESCRIPTION OF THE INVENTION

Figure 1:
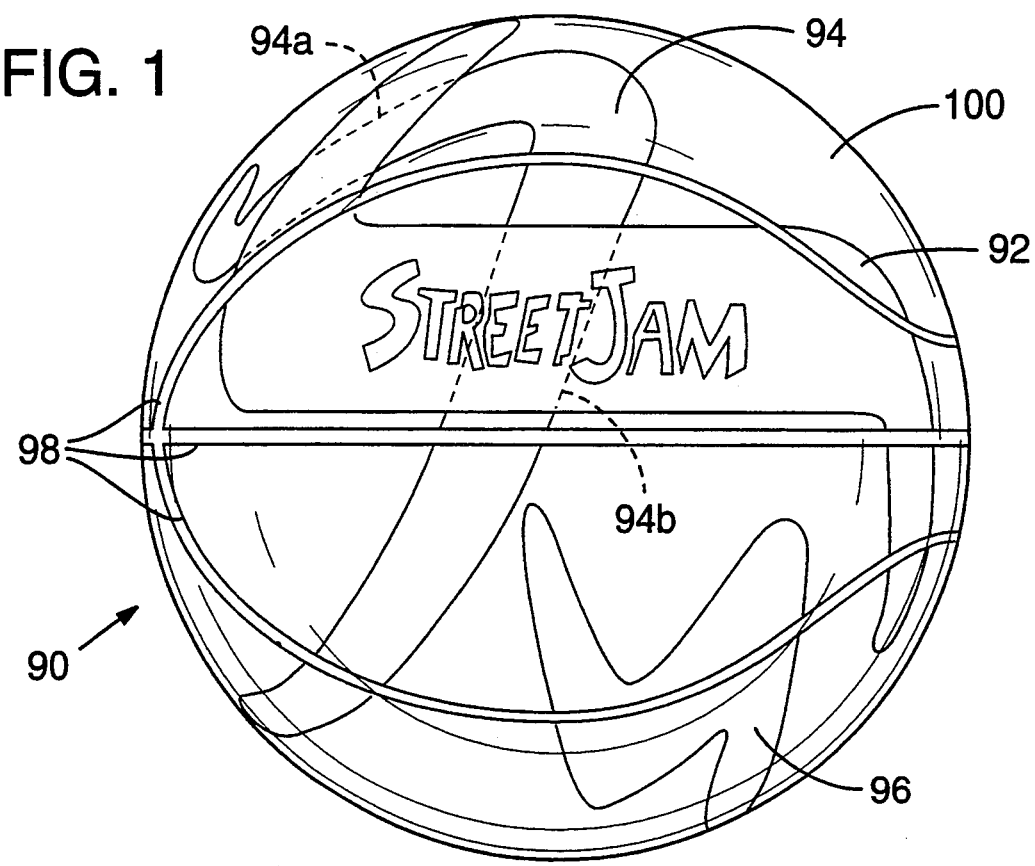
FIG. 1 illustrates a side of a game ball, more specifically a basketball, constructed pursuant to the invention.

A finished ball constructed pursuant to the invention may be manufactured from what is referred to herein as a ball body having a vulcanizable elastomer covering extending about or over the exterior of the ball body. A ball body of this description is illustrated, for instance, in FIG. 5, and given the reference number 10. The ball body includes a needle valve opening 12 which is adapted to have the end of a needle valve inserted thereinto, and which is used for the introduction of air under pressure to the interior of the ball body to inflate it.

The ball body may be made following any of a number of different procedures known in the art, from natural or synthetic rubbers, or from an elastomer blend of both natural and synthetic material. Describing a typical manufacture, a bladder may first be prepared from sheet material compounded of butyl rubber. Ordinarily, to prevent uneven inflation of the bladder by reason of inherent weak spots in the butyl material from which the bladder is prepared, the bladder is wrapped with either nylon or polyester rovings. These rovings may be applied in a conventional manner by placing in inflated bladder on slightly offset powered rollers, with the rollers producing rotation of the ball as thread material is wound thereabout. After rovings are applied, the inflated bladder may be curtain coated with an adhesive, to adhere the threads to themselves and the thread mat to the bladder which is within it. To complete the ball body 10, the bladder with its surrounding rovings of thread has an vulcanizable elastomer covering or coating prepared about its exterior, with this coating forming the exterior of the completed inflatable ball body. This covering of an outside rubber compound may be performed using different procedures known in the art.

This invention contemplates the application to a ball body coated with vulcanizable elastomer material of differently colored strips or patches, which may be cut from thin sheets of vulcanizable elastomer material. These patches may be applied to regions distributed about the circumference of the ball body. The patches ordinarily may have different irregular shapes, or might have regular outlines, as might be preferable when preparing a soccer ball, where the patches might have regular polygonal outlines. The applied patches might in some instances overly each other in certain regions. In a typical ball, the patches that are applied do not cover the entire ball, but are applied with the leaving of part of the elastomer coating of the ball body uncovered and exposed.

In a preferred embodiment of the invention, textured regions or regions of different tactile patterns are impressed on the ball, with the regions of tactile pattern ordinarily having a placement which is related to the placement of the patches. Thus, a tactile pattern region might complement or match a portion or all of a patch region in the completed ball. Further, regions of different tactile patterns might be impressed on background regions of the ball having no overlay patches applied thereto. With this type of manufacture, it is important, if the overlays are applied in one step and the different regions of tactile pattern applied at another step, that placement of the patches on the exterior of the inflated ball body be accurately performed, with the patches after placement having a predetermined position on the ball body.

Figure 5:
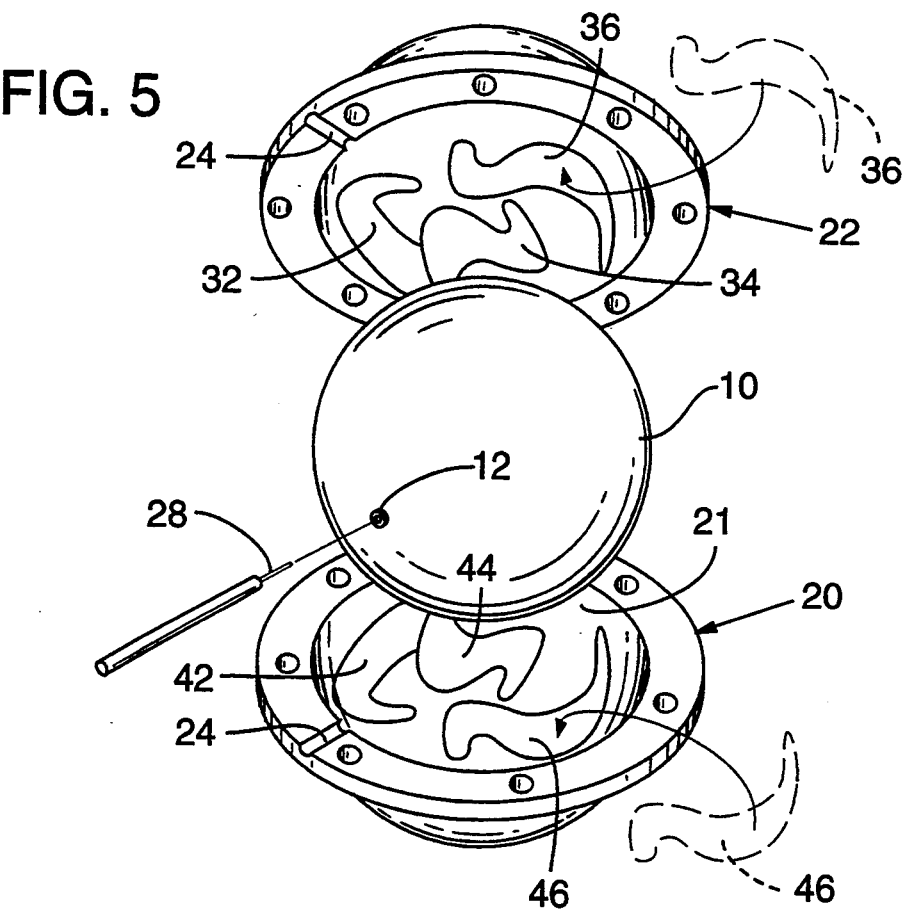
FIG. 5 illustrates diagrammatically how a placement mold is used in positioning patches to be incorporated in a ball.

Toward these ends, a placement mold may be utilized in the placing of the patches or patch overlays, as exemplified by the placement mold shown in FIG. 5. Such includes lower or upper hemispherical halves 20 and 22, each having a hemispherical internal mold surface, as exemplified by the surface shown at 21 for lower half 20. Extending from the interior to the exterior of each mold half is a passage half 24. With a needle inserted into the needle valve opening of the ball body, as exemplified by inflation needle 28 the ball body may be placed within the mold and located with respect to the internal mold surfaces using the needle which projects from the ball body and fits within the passage formed by passage halves 24.

Prior to bringing the halves of the placement mold together, patches are placed over the interior mold surfaces of the mold halves, as exemplified by the patches 32, 34, 36 placed in the upper mold half, and patches 42, 44, 46 placed in the lower mold half. The patches are placed in a predetermined position. The patches are suitably held in this predetermined position after placement. One manner of so holding the patches in place which would enable easy release is to provide a vacuum system, with vacuum outlets exposed in specified regions of the internal mold surfaces which are covered by the patches when properly positioned and held in place by the vacuum when the outlets are covered.

With the patches properly placed in their preselected positions, the ball body is placed between the mold halves and the mold halves brought together about the exterior of the ball body. The ball body may then be inflated by the admission of pressurized air into the ball body utilizing valve needle 28. With the mold halves brought together about the ball body, and the ball body inflated, the vacuum used in the vacuum system to hold the patches in place may be released. A transfer is then effected with the patches transferred from positions held against the mold surfaces to positions disposed against the exterior of the ball body. With the coating of the ball body of vulcanizable elastomer material being slightly tacky, and the patches of vulcanizable elastomer material also being slightly tacky, there normally will be an adhesion of the patches to the exterior of the ball body.

With the patches in place, the ball body with the patch overlays may be transferred to a vulcanizing mold, where heat is applied to vulcanize and cure the patches and the underlying elastomer coating to form a unified whole. The vulcanizing mold may be provided with tactile pattern regions, and the heat and pressure applied in the mold is effective to impress onto the forming ball the tactile patterns of the tactile pattern regions.

Figure 6:
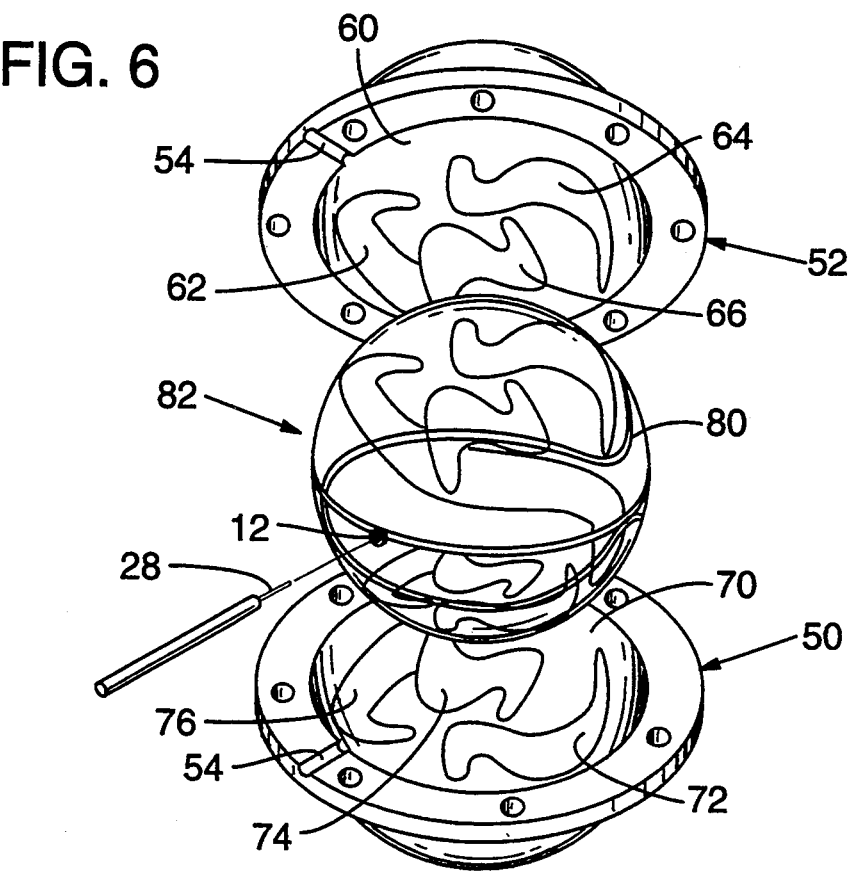
FIG. 6 illustrates diagrammatically a vulcanizing mold that may be used in impressing tactile pattern regions on the exterior of the ball.

FIG. 6 illustrates, in simplified form, a vulcanizing mold having lower and mold upper halves 50, 52. Again, these mold halves may include passage halves 54 accommodating the needle which serves to index the ball body so that applied patches are in proper registering position with the pattern regions formed on the inner mold surfaces.

More specifically, in FIG. 6, regions of different tactile patterns in mold surface 60 of the upper mold half are indicated at 62, 64 and 66. Regions of different tactile patterns in mold surface 70 of the lower half are shown at 72, 74 and 76. In the drawing, only the outline of different tactile pattern regions are shown, since the scale of the drawing does not permit greater detail. Suffice it to say that the tactile pattern regions are prepared in the vulcanizing mold which have a shape and distribution related to the shape and distribution of the patch covered regions and uncovered regions of the ball body which is placed thereinto.

The vulcanizing mold further may be provided with elongate ridges, not shown in the mold halves in FIG. 6 to eliminate clutter and for reasons of clarity. However, the ridges do produce in the processed ball, after heat treatment and vulcanizing, elongate seam-simulating channels, as indicated by the seam-simulating channels 80 shown in ball 82 illustrated in FIG. 6.

Figure 3:
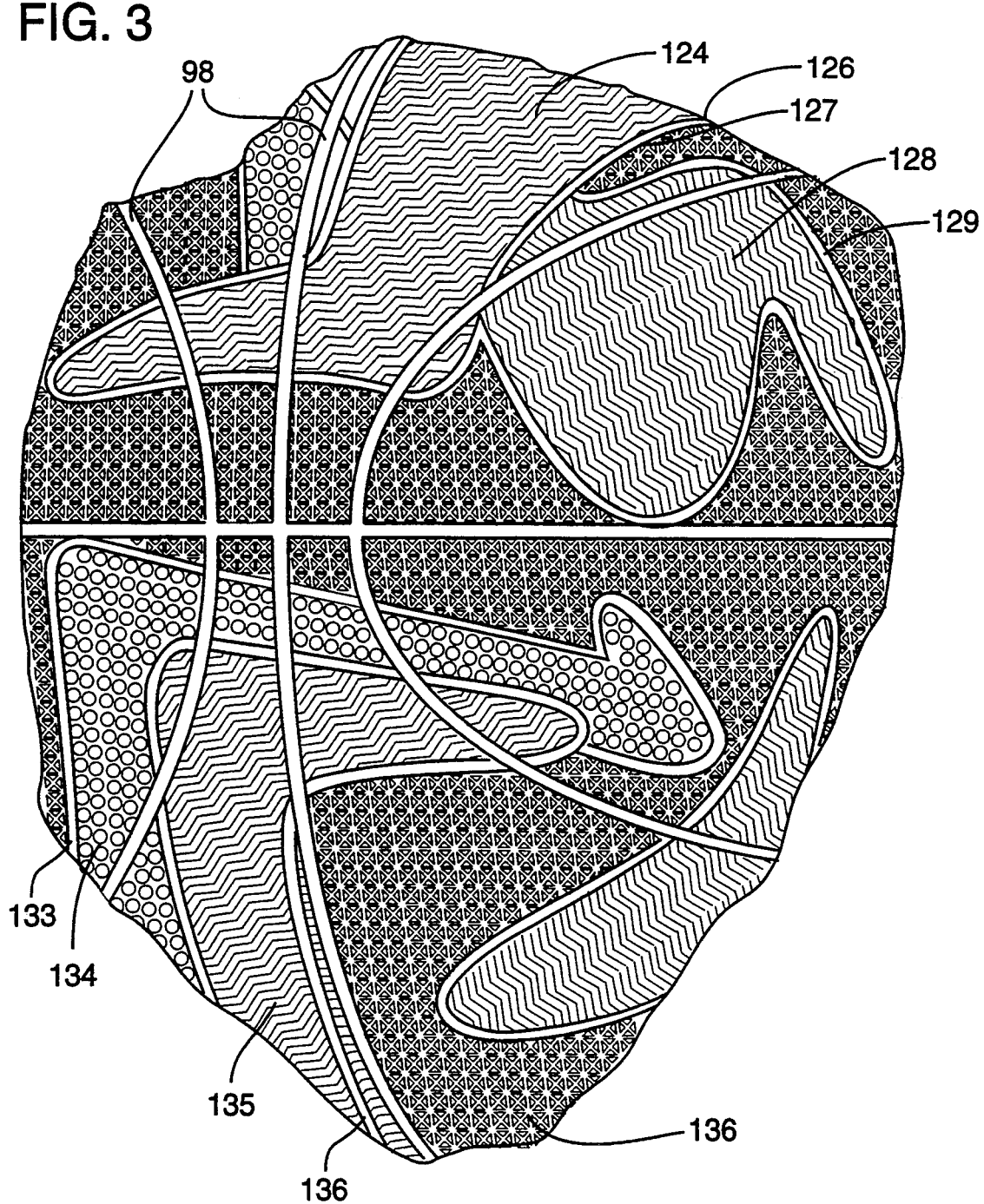
FIG. 3 is a view, on a somewhat larger scale, of portions of a game ball, illustrating different patch regions on the exterior of the ball and different tactile pattern regions impressed on the patch regions, as well as background regions of the ball.

The vulcanizing mold may further be provided with elongate ridges that produce boundary channels on the ball exterior, as exemplified by channels 127, 129, 133 and 136 shown in FIG. 3 for the ball pictured.

Summarizing the manufacture of the ball, after placement of the patches utilizing the placement mold of FIG. 5, the ball body is placed in the vulcanizing mold shown in FIG. 6, with the position of the ball accurately determined, so that the position of the applied patches have proper registering position with the tactile pattern regions made in the interior mold surfaces of the vulcanizing mold. Assisting in this proper positioning is the inclusion of the needle valve which projects from one side of the ball and serves to index the position of the ball. With the ball body and its overlay patches placed in the vulcanizing mold, and the mold halves brought together, and with the application of heat over a period of time, the exterior of the ball has tactile pattern regions impressed thereon. The exterior of the formed ball also has elongate seam-simulating channels impressed thereinto. Further, the patches and the elastomer coating of the ball body become fused together as a vulcanized unit.

Figure 2:
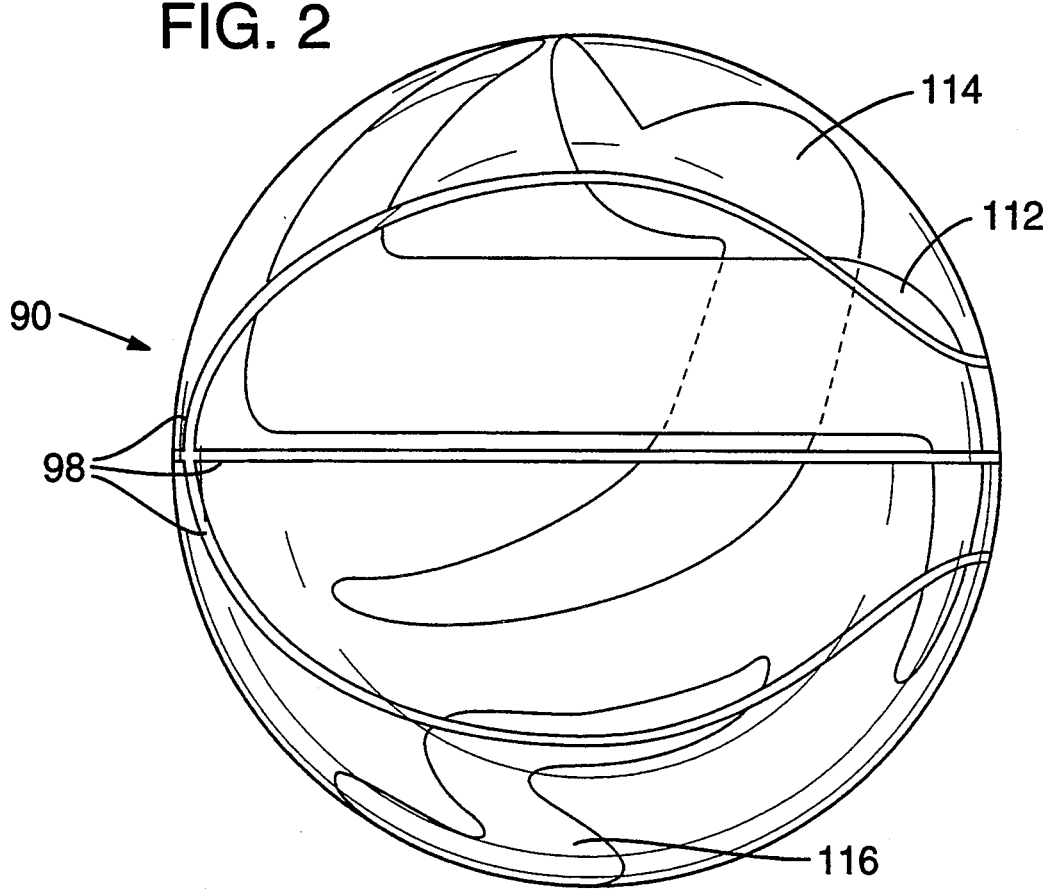
FIG. 2 illustrates the opposite side of the game ball illustrated in FIG. 1.

A ball 90 may be produced of the type illustrated in simplified form in FIGS. 1 and 2. The ball 90, on one side of the ball (see FIG. 1), has an elongate patch 92 of one color. Also forming part of the ball exterior is a patch 94 of a different color, which in regions 94a and 94b underlies patch 92 so as to be obscured thereby. Further making up the exterior of the ball is a patch 96. Extending in an elongate course over the ball exterior are seam-simulating channels 98. For purpose of illustration only, a ball might be prepared where the patch 92 has a light blue color, patch 94 a yellow color, and patch 96 a different color, such as black. Regions of the ball exterior devoid of any patch overlay, which is to say uncovered regions might have an orange color.

The seam-simulating channels, to make them more visually discernable might, be coated with a colored paint after ball manufacture, as for example, a black coloring.

In the manufacture of a ball, ordinarily patch placement is done with the patches on one side of the ball approximately balancing patches on the opposite side. Thus, it will be seen with reference to FIG. 2 (showing the opposite side of the ball) that the opposite side of the ball has a patch 112 which is roughly the counterpart in size and shape of patch 92, a patch 114 which is roughly the counterpart in size and shape to patch 94, and a patch 116 which is roughly the counterpart in size and shape to patch 96.

These patches might have distinctive colors of their own, or might be given colors related to the colors of their counterpart patches on the opposite side of the ball.

As has already been described, in the vulcanizing mold textured regions or tactile pattern regions are prepared on the surface of the form ball which cover regions which in shape and extent approximately match or correspond to significant portions of the overlaid patches applied to the ball, or to the regions of the ball which are uncovered with an overlaid patch.

Referring to FIG. 3, a patch 124 on the ball shown is illustrated with what might be described as a chevron pattern impressed into the patch in a region coextensive with the area embraced by the perimeter edge 126 or outline of the patch. Impressed into the exterior of the ball, directly outwardly of the outer edge 126 of patch 124, is a bounding channel 127. Patch 128 partially underlying patch 124 has a chevron pattern impressed thereinto, but with the pattern oriented at a different angle. Impressed into the exterior of the ball directly adjacent the perimeter edge of patch 128, is a bounding channel 129. The patch shown at 135 is illustrated with a tactile pattern extending thereover resembling the tactile pattern in patch 124. Bounding channel 136 is impressed into the ball directly outwardly of the perimeter edge of patch 135. Shown at 134 is a pebbled or nubbin texture applied to a region of the background of the ball which is uncovered with a patch. A bounding channel 133 partially embraces the region 134 provided with the nubbin texture. Remaining ball background regions 136 have impressed thereinto a pattern of small triangles.

Figure 4:
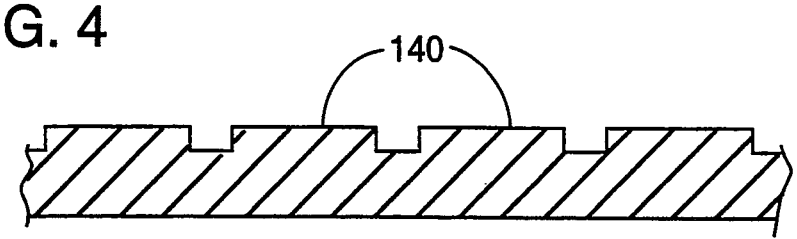
FIG. 4 is a view on an even larger scale showing the cross section of the ball and the elevation of nubbins forming part of a tactile pattern region.

In a tactile pattern region of the ball, the surface of the ball has a three-dimensional character. This is illustrated in FIG. 4, which is a greatly enlarged cross-sectional view taken through a portion of pebbled region 134 of the ball's surface. Forming the design are a series of shall protrusions designated at 140 which together form the pebbled texture in region 134.

In the ball illustrated in FIG. 3, seam-simulating channels 98 extend continuously through uncovered background regions of the ball as well as regions covered by a patch overlay. As discussed earlier, these seam simulating channels may be accentuated by the application of a suitable coloring to the ball after manufacture.

A ball constructed pursuant to the invention may be prepared with certain regions free of any tactile pattern impressed thereinto. This region free of any tactile pattern may correspond to a patch overlay region on the ball or a portion of the patch overlay region.

Balls constructed pursuant to the invention may have a spherical shape as typifies a soccer ball or basketball. Alternatively, the balls may have other shapes, such as the oblong shape that characterizes the American football.

It should be obvious that a wide variety of different colors and tactile patterns may be produced on the surface of a ball. A distinctive appearance is imparted to the ball. A ball may be produced with enhanced grippability which makes the ball, for instance, ideally suited for use in unimproved playground areas or in areas of inclement weather, etc.

While embodiments of the invention have been described it should be obvious that further variations and modifications are possible without departing from the invention.

It is claimed and desired to secure by Letters Patent:

1. An inflatable ball including an outer surface of elastomer material extending thereabout, said surface having bonded thereto irregularly shaped patches of substantial surface area distributed thereabout, said patches being distinctly colored and significantly different from each other in color, significantly different tactile patterns on said surface of the ball and said patches, with at least some tactile patterns generally corresponding in surface area and shape to that of selected patches to provide a variety of distinguishable gripping regions on a striking and attractive appearing ball which enables a user to rapidly grip the ball at the gripping regions preferred and selected by the user.

2. The ball of claim 1, wherein said outer surface of the ball also includes background regions encompassing said patches, and said background regions having different tactile patterns thereon.

3. The ball of claim 2 which further includes elongate colored seam-simulating channels extending thereover crossing both patches and background regions of the ball.

* * * * *